US012585995B2

(12) United States Patent
Sodhi et al.

(10) Patent No.: US 12,585,995 B2
(45) Date of Patent: Mar. 24, 2026

(54) CAPTURING DATA PROPERTIES TO RECOMMEND MACHINE LEARNING MODELS FOR DATASETS

(71) Applicant: International Business Machines Corporation, Armonk, NY (US)

(72) Inventors: Manjit Singh Sodhi, Bangalore (IN); Suja Mohandas, Palakkad (IN); Nitin Gupta, Saharanpur (IN); Kalapriya Kannan, Bangalore (IN); Prerna Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 17/936,045

(22) Filed: Sep. 28, 2022

(65) Prior Publication Data

US 2024/0104423 A1 Mar. 28, 2024

(51) Int. Cl.
*G06N 20/00* (2019.01)
*G06F 18/213* (2023.01)
*G06F 18/22* (2023.01)

(52) U.S. Cl.
CPC ........... *G06N 20/00* (2019.01); *G06F 18/213* (2023.01); *G06F 18/22* (2023.01)

(58) Field of Classification Search
CPC ........ G06N 20/00; G06F 18/22; G06F 18/213
See application file for complete search history.

(56) References Cited

U.S. PATENT DOCUMENTS 9,413,779 B2 8/2016 Vasseur et al.
2019/0019106 A1 1/2019 Driscoll et al.

| | | | |
|---|---|---|---|
| 2019/0303421 A1* | 10/2019 | Bonnell | G06F 16/9014 |
| 2019/0391956 A1 | 12/2019 | Kozhaya et al. | |
| 2021/0357803 A1* | 11/2021 | Bhide | G06N 5/02 |
| 2021/0390394 A1 | 12/2021 | Wang et al. | |
| 2022/0108210 A1 | 4/2022 | Wijaya et al. | |
| 2022/0382786 A1* | 12/2022 | Sankaranarayanan | G06N 5/022 |
| 2023/0061011 A1* | 3/2023 | Dain | G06F 16/248 |
| 2023/0196181 A1* | 6/2023 | Betthauser | G06N 20/00 706/12 |

FOREIGN PATENT DOCUMENTS

WO 2020247204 A1 12/2020

* cited by examiner

*Primary Examiner* — David E Choi
(74) *Attorney, Agent, or Firm* — Yee & Associates, P.C.

(57) ABSTRACT

Recommending machine learning models is provided. The method comprises training machine learning models, wherein each machine learning model is trained with a unique respective dataset. Metadata associated with each machine learning model is extracted, wherein the metadata includes properties of the respective dataset used to train the machine learning model. The machine learning models and metadata are stored in a model catalog. Upon receiving a new dataset, similarity scores are calculated between the new dataset and the machine learning models in the model catalog according to the properties of the datasets in the metadata of the machine learning models. A closest match machine learning model is identified from the model catalog for the new dataset according to similarity score. Responsive to a determination that the closest match machine learning model exceeds a similarity threshold, predictions for the new dataset are generated with the closest match machine learning model.

20 Claims, 5 Drawing Sheets

COMPUTING ENVIRONMENT
100

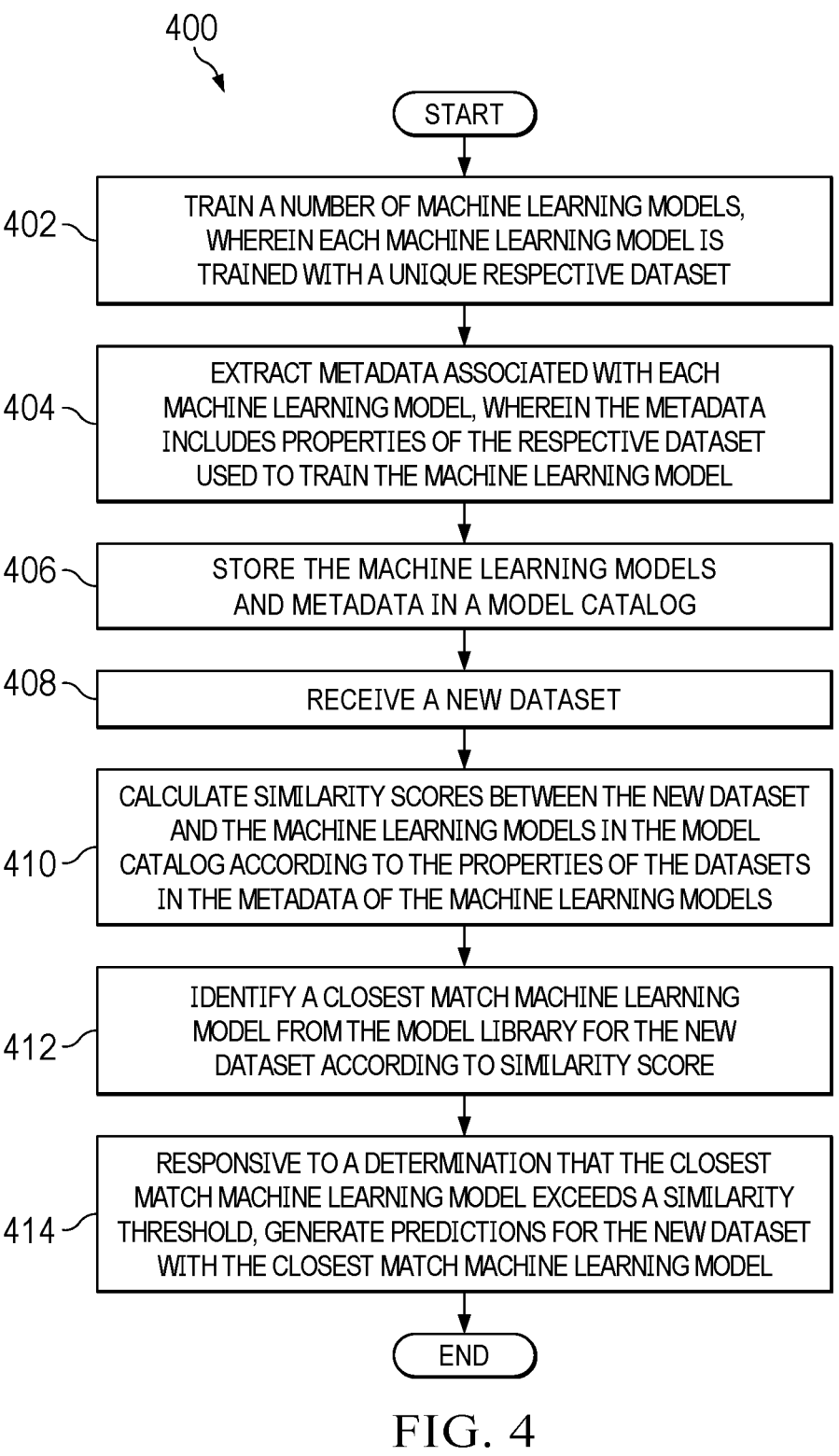

400

START

402 — TRAIN A NUMBER OF MACHINE LEARNING MODELS, WHEREIN EACH MACHINE LEARNING MODEL IS TRAINED WITH A UNIQUE RESPECTIVE DATASET

404 — EXTRACT METADATA ASSOCIATED WITH EACH MACHINE LEARNING MODEL, WHEREIN THE METADATA INCLUDES PROPERTIES OF THE RESPECTIVE DATASET USED TO TRAIN THE MACHINE LEARNING MODEL

406 — STORE THE MACHINE LEARNING MODELS AND METADATA IN A MODEL CATALOG

408 — RECEIVE A NEW DATASET

410 — CALCULATE SIMILARITY SCORES BETWEEN THE NEW DATASET AND THE MACHINE LEARNING MODELS IN THE MODEL CATALOG ACCORDING TO THE PROPERTIES OF THE DATASETS IN THE METADATA OF THE MACHINE LEARNING MODELS

412 — IDENTIFY A CLOSEST MATCH MACHINE LEARNING MODEL FROM THE MODEL LIBRARY FOR THE NEW DATASET ACCORDING TO SIMILARITY SCORE

414 — RESPONSIVE TO A DETERMINATION THAT THE CLOSEST MATCH MACHINE LEARNING MODEL EXCEEDS A SIMILARITY THRESHOLD, GENERATE PREDICTIONS FOR THE NEW DATASET WITH THE CLOSEST MATCH MACHINE LEARNING MODEL

END

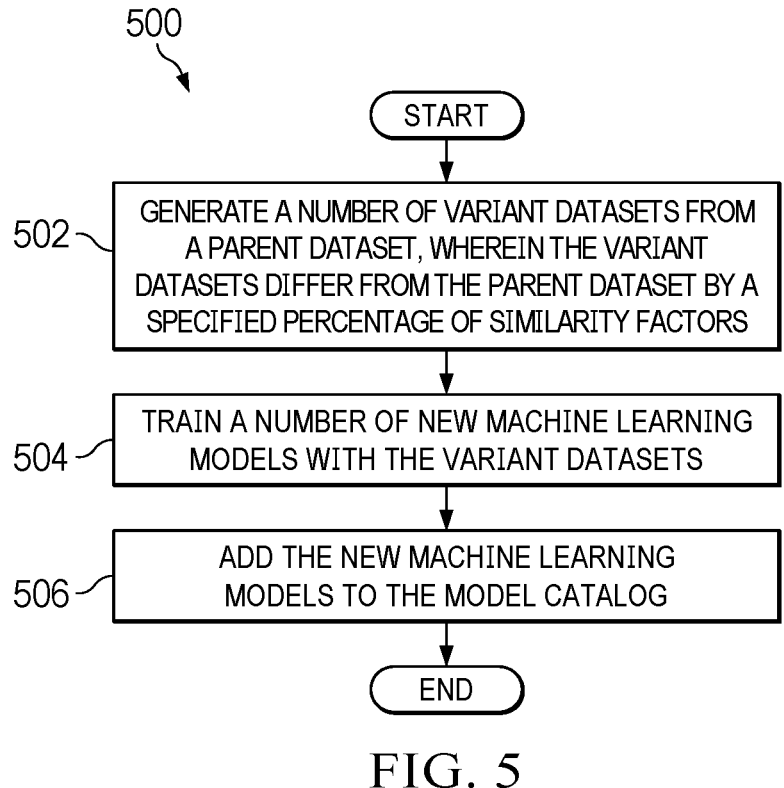

START

502 — GENERATE A NUMBER OF VARIANT DATASETS FROM A PARENT DATASET, WHEREIN THE VARIANT DATASETS DIFFER FROM THE PARENT DATASET BY A SPECIFIED PERCENTAGE OF SIMILARITY FACTORS

504 — TRAIN A NUMBER OF NEW MACHINE LEARNING MODELS WITH THE VARIANT DATASETS

506 — ADD THE NEW MACHINE LEARNING MODELS TO THE MODEL CATALOG

END

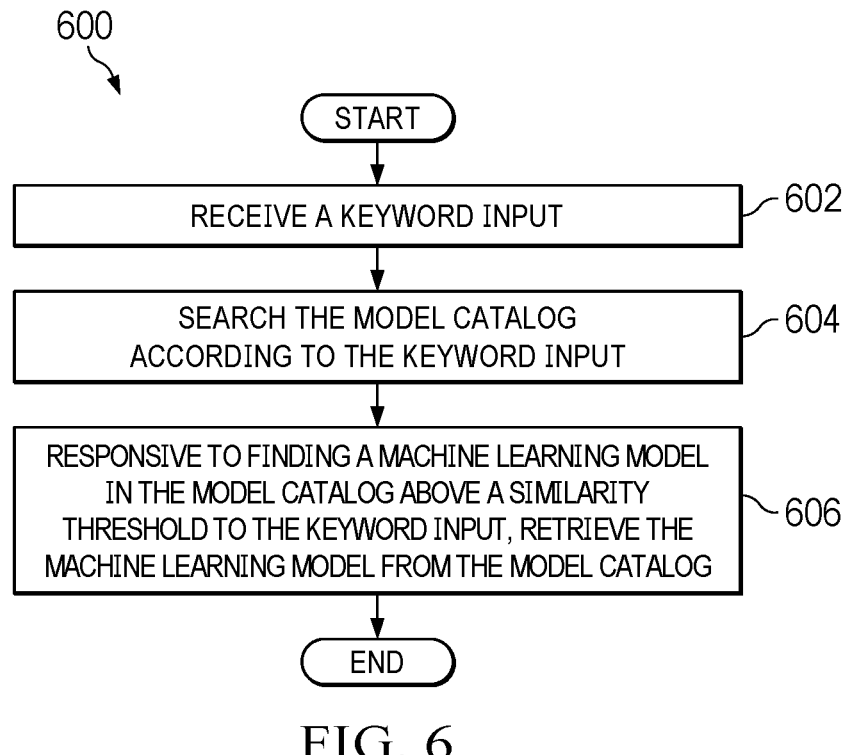

START

RECEIVE A KEYWORD INPUT — 602

SEARCH THE MODEL CATALOG ACCORDING TO THE KEYWORD INPUT — 604

RESPONSIVE TO FINDING A MACHINE LEARNING MODEL IN THE MODEL CATALOG ABOVE A SIMILARITY THRESHOLD TO THE KEYWORD INPUT, RETRIEVE THE MACHINE LEARNING MODEL FROM THE MODEL CATALOG — 606

END

FIG. 6

CAPTURING DATA PROPERTIES TO RECOMMEND MACHINE LEARNING MODELS FOR DATASETS

BACKGROUND

1. Field

The present disclosure relates generally to an improved computing system, and more specifically to a method for recommending machine learning models according to features of datasets.

2. Background

Machine learning models derive insights from data and may drive business-critical decisions, providing benefits such as performance predictions to identifying faults. The two main phases in data science pipelines are training and testing. In the training phase, the machine learning model is created on a dataset that has labels (training data). The model is then applied to test data or used for inferencing on live data.

Therefore, it would be desirable to have a method and apparatus that take into account at least some of the issues discussed above, as well as other possible issues.

SUMMARY

An illustrative embodiment provides a computer-implemented method of recommending machine learning models. The method comprises training a number of machine learning models, wherein each machine learning model is trained with a unique respective dataset. Metadata associated with each machine learning model is extracted, wherein the metadata includes properties of the respective dataset used to train the machine learning model. The machine learning models and metadata are stored in a model catalog. Upon receiving a new dataset, similarity scores are calculated between the new dataset and the machine learning models in the model catalog according to the properties of the datasets in the metadata of the machine learning models. A closest match machine learning model is identified from the model catalog for the new dataset according to similarity score. Responsive to a determination that the closest match machine learning model exceeds a similarity threshold, predictions for the new dataset are generated with the closest match machine learning model. According to other illustrative embodiments, a computer system, and a computer program product for recommending machine learning models are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 depicts a flowchart of a process for recommending machine learning models in accordance with an illustrative embodiment;

FIG. 5 depicts a flowchart of a process for generating new datasets and machine learning models in accordance with an illustrative embodiment; and FIG. 6 depicts a flowchart of a process for searching a machine learning model catalog in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
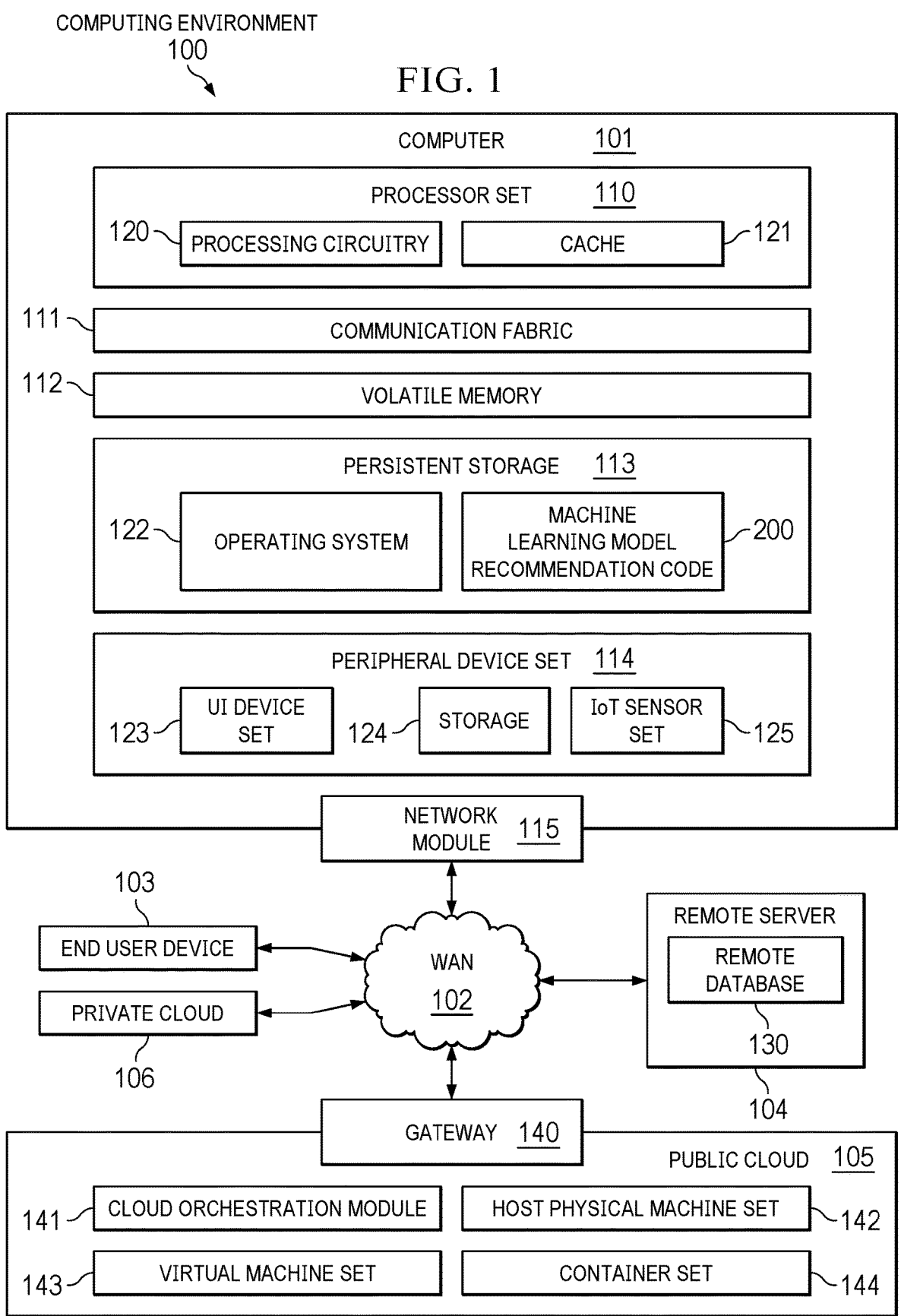
FIG. 1 depicts a pictorial representation of a computing environment in which illustrative embodiments may be implemented.
Figure 2:
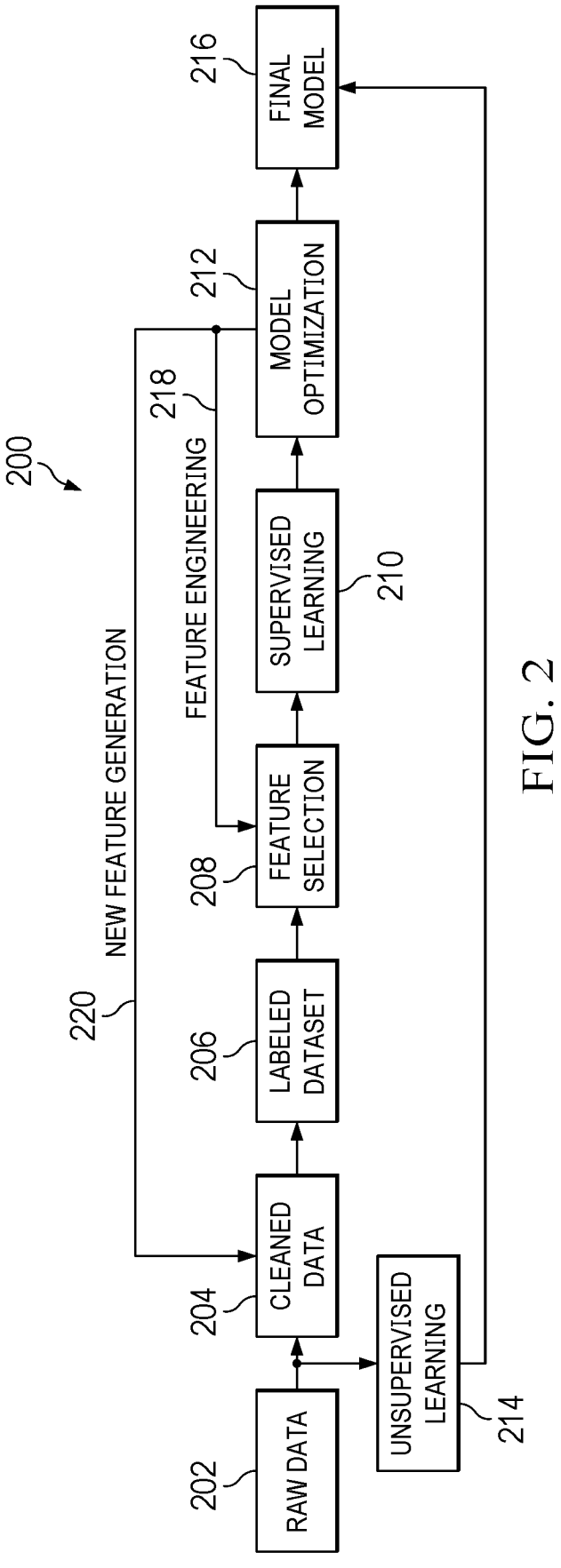
FIG. 2 depicts a pictorial representation of a process for creating a machine learning model with which an illustrative embodiment may be implemented.
Figure 3:
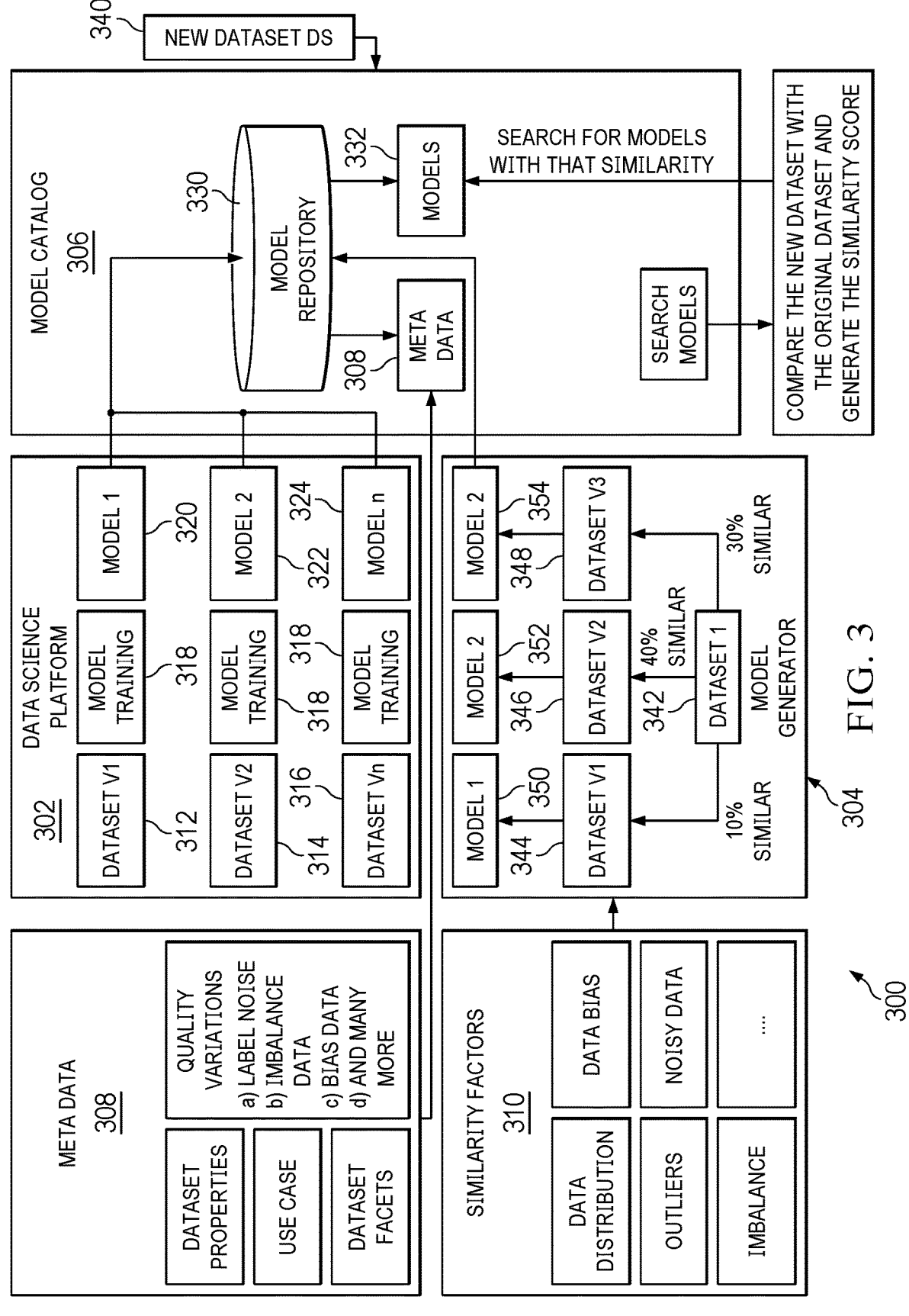
FIG. 3 depicts a pictorial representation of a machine learning model recommendation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a computing environment in which illustrative embodiments may be implemented. Computing environment 100 contains an example of an environment for the execution of at least some of the computer code involved in performing the inventive methods, such as machine learning (ML) model recommendation code 200. In addition to ML model recommendation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and ML model recommendation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in ML model recommendation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. ML model recommendation code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that machine learning models derive insights from data and may drive business-critical decisions, providing benefits such as performance predictions to identifying faults. The illustrative embodiments also recognize and take into account that the two main phases in data science pipelines are training and testing. In the training phase, the machine learning model is created on a dataset that has labels (training data). The model is then applied to test data or used for inferencing on live data.

The illustrative embodiments recognize and take into account that a machine model should be trained as frequently as the data changes. If the data changes frequently, the model needs to be trained frequently as well, resulting in expensive CPU usage. Furthermore, the illustrative embodiments also recognize and take into account that the time to train a model varies depending on the size of the dataset. For example, 2 GB of data may take roughly ten hours to produce a trained machine learning model.

The illustrative embodiments provide a model catalog of existing machine learning models that may be recommended for use with new datasets. The illustrative embodiments build the model catalog with models and their variations and store metadata related to the datasets used to train the models. This metadata may be used as a first layer search to identify datasets that are similar in nature to new datasets and map the new datasets to an existing model for ready inference.

The illustrative embodiments provide the technical improvement of reducing machine learning model building time or even eliminating the need for new model building, thereby reducing computing resources consumption and power utilization.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A macro (short for macro instruction) is a programmable pattern that translates a sequence of inputs to a preset sequence of outputs. A macro provides a single program statement in place of a sequence of computing instructions. In an illustrative embodiment, the preprocessor is configured to generate information records that direct the debugger to set one or more breakpoints at selected computer instructions enclosed by the macros ("macro enclosed" codes or records). Breakpoints can be used to cause a debugger to pause at the code line indicated by a breakpoint. At this point, validated parts of code can be run while pausing execution of the macro in areas that need further testing.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

FIG. 2 depicts a pictorial representation of a process for creating an ML model with which an illustrative embodiment may be implemented. There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

In the illustrated example, raw data 202 undergoes cleaning/transformation to refine the dataset into clean data 204 for use in building predictive models. The cleaned data 204 is used to construct a labeled dataset 206. Feature selection 208 extracts the most relevant data from the labeled dataset 206 for supervised learning 210. Model optimization 212 may iteratively employ new feature generation 220 from the cleaned data 204 as well as feature engineering 218 to extract different features from the labeled dataset 206. After optimization, process 200 arrives at a final model 216. Unsupervised learning 214, in contrast, works directly with the raw data 202 to arrive at a final model 216.

An artificial intelligence (AI) pipeline has two phases: data is typically divided into training data and testing data. The training data is used to produce the ML model that is then tested for measurements on the testing data.

In practice, the ML model training is performed at a set interval (e.g., once in three to four days) and may span anywhere from minutes to several days depending on the size of the data. ML models need to be retained because of potential drift or because features and weights need to be recalculated. Such retraining is a continuous process in production environments to maintain accurate prediction rates.

A data scientist typically identifies the data to be changed in the ML model and begins the ML model training process. When the data scientist develops the ML model, the data scientist may undertake several stages with different datasets and therefore different versions of the ML model.

Searching data is the most cumbersome task on the disks. For example, without indexing, on a storage of 50 GB it takes roughly three hours to search for a content. Within indexing, the required time may decrease approximately 90% but would still be high.

FIG. 3 depicts a pictorial representation of an ML model recommendation system in accordance with an illustrative embodiment. ML model recommendation system 300 may be implemented by machine learning model recommendation code 200 in computing environment 100 in FIG. 1.

ML model recommendation system 300 comprises a content collection system and a model recommendation system. Content collection includes collecting models and metadata as well as new data generation for model training. Model recommendation is based on dataset similarity using metadata comparison.

Data science platform 302 is able to train ML models 320, 322, 324 with different corresponding dataset versions 312, 314, 316. Each of the dataset versions 312, 314, 316 is fed through model training 318 to produce models 320, 322, 324, respectively.

Concurrently, ML model recommendation system 300 also captures the metadata 308 of the dataset versions 312, 314, 316. Metadata 308 may comprise dataset properties that encompass all information about the dataset. Metadata 308 may include the use case (underlying task) of the ML models as well as model performance. Metadata 308 may include data facets such as, e.g., fields and dimensions in the dataset, varying components, rate of change, minimum and maximum values for each dimension, histograms, frequency, and data distributions. Metadata 308 may also include quality variations in the datasets such as, for example, label noise, bias, imbalance, etc.

The ML models 320, 322, 324 created by data science platform 302, as well as metadata 308 extracted from the different dataset versions 312, 314, 316 are stored in model catalog 306. Model catalog 306 comprises a model repository 330 that includes models 332 and the extracted metadata 308. Model catalog 306 provides a search interface for identifying the correct model for a new dataset 340. The model catalog 306 may hold properties about datasets in metadata 308 to identify matches between incoming the datasets 340 and existing ML models 332. These properties may include data distribution, class histogram, feature histograms, etc., and are used to identify the closest preexisting dataset to the incoming new dataset 340. Upon identifying a similar dataset, the ML model available for that dataset can be used to generate predictions for the new dataset 340. Identifying a similar dataset may employ similarity measures such as Jaccard, cosine, Fast Fourier Transform (FFT), Euclidean, etc.

A threshold may also be set above which the closest dataset must exceed in order for its corresponding ML model to be used for the new dataset. Though the closest dataset may be relatively closer to the new dataset than any of the other datasets in the model catalog 306, the threshold ensures that the closest dataset is also similar enough to the new dataset in absolute terms to provide an accurate ML model for predictions.

ML model recommendation system 300 also comprises a model generator 304 that may be used to create new models based on a parent dataset. A data scientist can provide different input variants (booster programs) from which specific datasets can be generated. The model generator 304 can thereby leverage an existing dataset. The booster program can take as input a series of similarity measures and produce variant datasets from an initial parent dataset.

Starting with a parent dataset 342, the model generator 304 can manipulate similarity factors 310 to generate variant datasets 344, 346, 348 that differ from the parent dataset 342 by a specified percentage. In the present example, model generator 304 generates dataset variant 344 that is 10% similar to the parent dataset 342 and used to train model 350. In the present example, model generator 304 also generates dataset variant 346 that is 40% similar to parent dataset 342 and used to train model 352. Similarly, dataset variant 348 is 30% similar to parent dataset 342 and is used to train model 354. The differences in similarity between the parent dataset 342 and variant datasets 344, 346, 348 can be achieved by specifically altering the similarity factors 310 such as data distribution, outliers, imbalance, data bias, noise, etc., according to different use cases to which the trained models are to be applied. After training, the new ML models 350, 252, 354 are pushed to the model repository 330 in model catalog 306.

Model generator 304 can also examine data statistics collected over time to understand metrics such as rate of change, drift, etc., in order to generate data characteristics from data history to generate new datasets.

In situations in which a new dataset does not exist, a user may also enter a keyword search that is applied against the model catalog 306 to find a desired dataset and existing ML model.

FIG. 4 depicts a flowchart of a process for recommending machine learning models in accordance with an illustrative embodiment. Process in 400 can be implemented in hardware, software, or both. When implemented in software, the process can take the form of program instructions that is run by one of more processor units located in one or more hardware devices in one or more computer systems. For example, the process can be implemented in ML model recommendation system 300 in FIG. 3.

Process 400 begins by training a number of machine learning models, wherein each machine learning model is trained with a unique respective dataset (step 402).

Process 400 then extracts metadata associated with each machine learning model, wherein the metadata includes properties of the respective dataset used to train the machine learning model (step 404) and stores the machine learning models and metadata in a model catalog (step 406). The metadata may further include at least one of use case, outliers, dataset facets, or quality variations. Data facets may comprise varying components, rate of change, minimum and maximum values for each dimension, histograms, frequency, or distribution.

Upon receiving a new dataset (step 408), process 400 calculates similarity scores between the new dataset and the machine learning models in the model catalog according to the properties of the datasets in the metadata of the machine learning models (step 410). The similarity scores may be calculated with at least one of Jaccard similarity, cosine similarity, Fast Fourier Transform, or Euclidean similarity.

Process 400 identifies a closest match machine learning model from the model catalog for the new dataset according to similarity score (step 412).

Responsive to a determination that the closest match machine learning model exceeds a similarity threshold, process 400 generates predictions for the new dataset with the closest match machine learning model (step 414). Process 400 then ends.

FIG. 5 depicts a flowchart of a process for generating new datasets and machine learning models in accordance with an illustrative embodiment. Process 500 may be performed as part of step 402 in FIG. 4 as a way to generate additional ML models from an existing dataset.

Process 500 begins by generating a number of variant datasets from a parent dataset, wherein the variant datasets differ from the parent dataset by a specified percentage of similarity factors (step 502). The similarity factors may comprise at least one of data distribution, outliers, imbalance, bias, or label noise.

Process 500 trains a number of new ML models with the variant datasets (step 504) and adds the new machine learning models to the model catalog (step 506). Process 500 then ends.

FIG. 6 depicts a flowchart of a process for searching a machine learning model catalog in accordance with an illustrative embodiment. Process 600 may be performed when a new dataset is not available for process 400.

Process 600 begins by receiving a keyword input (step 602). Process 600 then searches the model catalog according to the keyword input (step 604). Responsive to finding a machine learning model in the model catalog above a similarity threshold to the keyword input, process 600 retrieves the machine learning model from the model catalog (step 606). This second similarity threshold is distinct from the dataset similarity threshold in process 400. Process 600 ends thereafter.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of recommending machine learning models, the method comprising:

training a number of machine learning models, wherein each machine learning model is trained with a unique respective dataset;

extracting metadata associated with each machine learning model, wherein the metadata includes properties of the respective dataset used to train the machine learning model;

storing the machine learning models and metadata in a model catalog;

receiving a new dataset;

calculating similarity scores between the new dataset and the machine learning models in the model catalog according to the properties of the datasets in the metadata of the machine learning models;

identifying a closest match machine learning model from the model catalog for the new dataset according to similarity score;

responsive to a determination that the closest match machine learning model exceeds a similarity threshold, generating predictions for the new dataset with the closest match machine learning model;

generating a number of variant datasets from a parent dataset, wherein the variant datasets differ from the parent dataset by a specified percentage of similarity factors;

training a number of new machine learning models with the variant datasets; and adding the new machine learning models to the model catalog.

2. The method of claim 1, wherein the similarity factors comprise at least one of:

data distribution;

outliers;

imbalance;

bias; or label noise.

3. The method of claim 1, wherein the metadata further includes at least one of:

use case;

outliers;

dataset facets; or quality variations.

4. The method of claim 3, wherein the dataset facets comprise at least one of:

varying components;

rate of change;

minimum and maximum values for each dimension;

histograms;

frequency; or distribution.

5. The method of claim 1, wherein the similarity scores are calculated with at least one of:

Jaccard similarity;

cosine similarity;

Fast Fourier Transform; or

Euclidean similarity.

6. The method of claim 1, further comprising:

receiving a keyword input;

searching the model catalog according to the keyword input; and responsive to finding a machine learning model in the model catalog above a second similarity threshold to the keyword input, retrieving the machine learning model from the model catalog.

7. A system for recommending machine learning models, the system comprising:

a storage device that stores program instructions; and one or more processors operably connected to the storage device and configured to execute the program instructions to cause the system to:

train a number of machine learning models, wherein each machine learning model is trained with a unique respective dataset;

extract metadata associated with each machine learning model, wherein the metadata includes properties of the respective dataset used to train the machine learning model;

store the machine learning models and metadata in a
   model catalog;
receive a new dataset;
calculate similarity scores between the new dataset and
   the machine learning models in the model catalog
   according to the properties of the datasets in the
   metadata of the machine learning models;
identify a closest match machine learning model from
   the model catalog for the new dataset according to
   similarity score;
responsive to a determination that the closest match
   machine learning model exceeds a similarity thresh-
   old, generate predictions for the new dataset with the
   closest match machine learning model;
generating a number of variant datasets from a parent
   dataset, wherein the variant datasets differ from the
   parent dataset by a specified percentage of similarity
   factors;
training a number of new machine learning models
   with the variant datasets; and
adding the new machine learning models to the model
   catalog.
   8. The system of claim 7, wherein the similarity factors
comprise at least one of:
   data distribution;
   outliers;
   imbalance;
   bias; or
   label noise.
   9. The system of claim 7, wherein the metadata further
includes at least one of:
   use case;
   outliers;
   dataset facets; or
   quality variations.
   10. The system of claim 7, wherein the similarity scores
are calculated with at least one of:
   Jaccard similarity;
   cosine similarity;
   Fast Fourier Transform; or
   Euclidean similarity.
   11. The system of claim 7, wherein the processors further
execute instructions to:
   receiving a keyword input;
   searching the model catalog according to the keyword
      input; and
   responsive to finding a machine learning model in the
      model catalog above a second similarity threshold to
      the keyword input, retrieving the machine learning
      model from the model catalog.
   12. A computer program product for recommending
machine learning models, the computer program product
comprising:
   a persistent storage medium having program instructions
      embodied thereon to perform the steps of:
      training a number of machine learning models, wherein
         each machine learning model is trained with a unique
         respective dataset;
      extracting metadata associated with each machine
         learning model, wherein the metadata includes prop-
         erties of the respective dataset used to train the
         machine learning model;
      storing the machine learning models and metadata in a
         model catalog;
      receiving a new dataset;
      calculating similarity scores between the new dataset
         and the machine learning models in the model catalog according to the properties of the datasets in the
   metadata of the machine learning models;
identifying a closest match machine learning model
   from the model catalog for the new dataset according
   to similarity score;
responsive to a determination that the closest match
   machine learning model exceeds a similarity thresh-
   old, generating predictions for the new dataset with
   the closest match machine learning model;
generating a number of variant datasets from a parent
   dataset, wherein the variant datasets differ from the
   parent dataset by a specified percentage of similarity
   factors;
training a number of new machine learning models
   with the variant datasets; and
adding the new machine learning models to the model
   catalog.
   13. The computer program product of claim 12, wherein
the similarity factors comprise at least one of:
   data distribution;
   outliers;
   imbalance;
   bias; or
   label noise.
   14. The computer program product of claim 12, wherein
the metadata further includes at least one of:
   use case;
   outliers;
   dataset facets; or
   quality variations.
   15. The computer program product of claim 14, wherein
the dataset facets comprise at least one of:
   varying components;
   rate of change;
   minimum and maximum values for each dimension;
   histograms;
   frequency; or
   distribution.
   16. The computer program product of claim 12, wherein
the similarity scores are calculated with at least one of:
   Jaccard similarity;
   cosine similarity;
   Fast Fourier Transform; or
   Euclidean similarity.
   17. The computer program product of claim 12, further
comprising instructions for:
   receiving a keyword input;
   searching the model catalog according to the keyword
      input; and
responsive to finding a machine learning model in the model
   catalog above a second similarity threshold to the keyword
   input, retrieving the machine learning model from the model
   catalog.
   18. The system of claim 9, wherein the dataset facets
comprise at least one of:
   varying components;
   rate of change;
   minimum and maximum values for each dimension;
   histograms;
   frequency; or
   distribution.
   19. The method of claim 1, wherein the step of training
comprises:
   retraining one or more models of the number of machine
      learning models at a set interval.
   20. The computer program product of claim 12 wherein
training further comprises:

retraining one or more models of the number of machine
learning models at a set interval.

\* \* \* \* \*